UNITED STATES PATENT OFFICE.

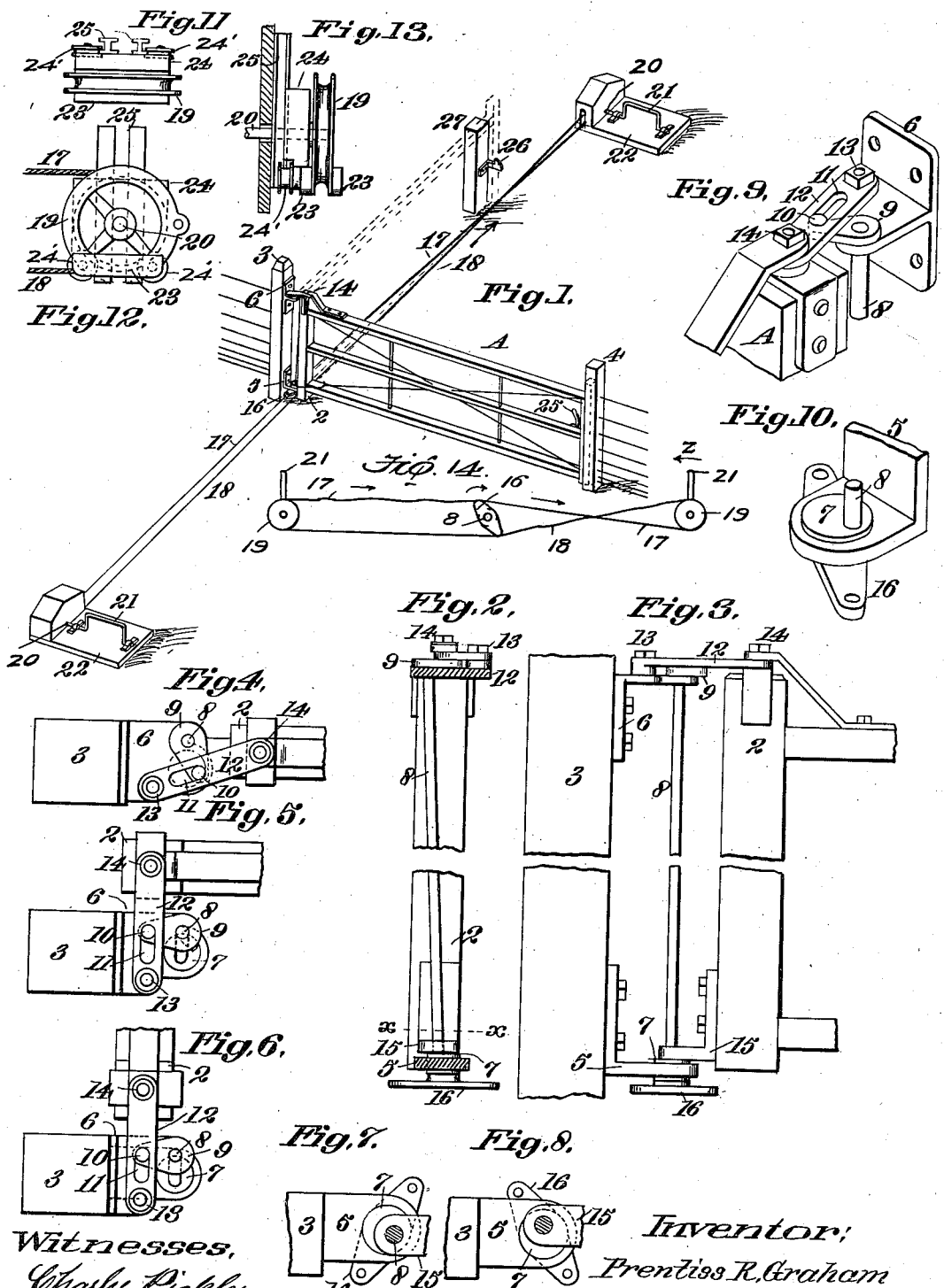

PRENTISS R. GRAHAM, OF PETALUMA, CALIFORNIA.

FARM-GATE.

1,015,676.  Specification of Letters Patent.  Patented Jan. 23, 1912.

Application filed January 6, 1911. Serial No. 601,211.

*To all whom it may concern:*

Be it known that I, PRENTISS R. GRAHAM, a citizen of the United States, residing at Petaluma, in the county of Sonoma and State of California, have invented new and useful Improvements in Farm-Gates, of which the following is a specification.

This invention relates to a farm-gate of that class which is designed to be opened or closed from a distance by means of the wheels of a vehicle passing over a crank or bail actuating device, and particularly pertains to improvements in a gate hinge for automatically operated gates.

It is the object of this invention to provide a simple device for hingedly mounting a gate, which device is adapted to be operated from a distance in such manner as to throw the hinged or pivoted end of the gate out of vertical alinement with its bearing point in such manner as to cause the gate to swing from a closed to an open position.

A further object is to provide a pivotal mounting for a gate which may be operated from a distance to cause the gate to swing, which is simple in construction effective and economical.

This invention consists of the parts and the construction and combination of parts as hereinafter more fully described and claimed having reference to the accompanying drawings, in which—

Figure 1 is a perspective view of the invention, as applied. Fig. 2 is a rear end view of the gate, illustrating the pivotal mountings. Fig. 3 is a side elevation of same. Fig. 4 is a plan view of the gate hinge as applied, showing the gate in a closed position. Fig. 5 is a plan view, showing the hinge as thrown into an eccentric position, to cause the gate to open. Fig. 6 is a similar view, showing the gate in the open position. Fig. 7 is an enlarged section on the line x x, Fig. 2, showing the gate actuating cross-head in its normal position. Fig. 8 is a similar view, showing the cross-head in the position assumed in throwing the gate hinge on the eccentric. Fig. 9 is a detail view in perspective of the upper portion of the gate hinge. Fig. 10 is a similar view of the lower portion. Fig. 11 is a plan view of the gate actuating device. Fig. 12 is a side elevation of same. Fig. 13 is an end elevation of same with parts broken away. Fig. 14 is a diagram of the gate-operating mechanism.

In the drawings, A represents a gate of any suitable construction, having a vertically disposed frame member 2 on its rear end.

3 is a bearing post on which the gate is carried, and 4 is a post to which the gate A is latched, when in its closed position.

The essence of this invention resides in the method and mechanism by which the gate A is connected to the post 3. A bracket 5 is mounted on the post 3 at a point near the lower end of the frame member 2, and a bracket 6 is mounted on the post 3 at a point near the upper end of the frame member 2. Mounted in the bracket 5, is a revoluble disk 7 in which the lower end of a vertically disposed rod 8 is eccentrically mounted. This rod 8 extends upward parallel with the post 3, through the bracket 6 and has a crank arm 9 on its upper end. This crank arm 9 has an upwardly projecting pin 10 which extends into a slot 11 formed in a link 12, pivotally mounted at 13 on the bracket 6, eccentric to the rod 8, the outer end of the link 12 being pivotally connected at 14 to the upper end of the frame member 2. A bracket 15 is mounted on the lower end of the frame member 2 and is adapted to rest upon the disk 7 in the bracket 5 thus supporting the gate frame at this point; the rod 8 extending through the bracket 15.

Mounted on the lower end of the disk 7, beneath the bracket 5 is a cross head 16, the outer end of which is connected to oppositely extending cables 17 and 18; these cables being arranged at right angles to the gate A when the latter is in its closed position. The outer ends of the cables 17 and 18 on each side of the gate A, pass on opposite sides of and are secured to a sheave 19, as shown in Figs. 12 and 14, one end of the cable 17 being attached to the upper edge of one of the sheaves 19 while the other end connects with the lower edge of the other sheave 19, the cable 18 being likewise arranged with one end attached to the upper edge of the sheave 19, to the lower edge of which the cable 17 is secured, and is connected to the lower edge of the sheave 19 on the upper edge of which the cable 17 is secured. Each sheave 19 is mounted on a shaft 20, which is bent at 21 to form a crank and is mounted in suitable bearings on a base plate 22. An offset or shoulder 23 is formed on the lower inner face of the sheave 19 and a counter-weight 24 slidable in guides 25 extends on each side of the shaft 20 with its lower end resting on the outer ends of the shoulder 23 in such manner that when the sheave 19 is rotated in either direction, the shoulder 23 will raise the counter-weight 24 in the guides 25. Flanged rollers 24' are mounted on the weight 24 and are adapted to travel on the guides 25, these rollers 24 being so disposed as to prevent the weight 24 from binding as it is raised by the action of the sheave 19. The purpose of this counter-weight 24 is to normally retain the sheave 19 with the shoulder 23 in its lowermost position, in which position the crank 21 will be vertically disposed in relation to the base plate 22.

In operation, the lever 21 being depressed or rocked in a direction toward the gate A so as to extend horizontally as will be the case when a vehicle passes thereover, the shaft 20 and the sheave 19 will be rotated one-fourth of a revolution in such manner as to exert an outward pull on either one of the cables 17 or 18 according to which lever is operated so as to pull upon the cross head 16 to move it from the position shown in Fig. 7 into the position shown in Fig. 8. This causes the disk 7 to rotate approximately one-fourth of a revolution, which operation throws the rod 8 out of vertical alinement. The rod 8 rotating with the disk 7, rotates the crank arm 9 approximately one-fourth of a revolution so as to swing the link 12 on its pivotal bearings 13 at right angles to the post 3. This action exerts a pull upon the upper end of the frame member 2 so as to rock the gate A longitudinally on its bracket bearing 15 to release a latch connection between the outer end of the gate A and the post 4. This action also throws the pivotal bearings 14 at the upper end of the gate frame 2 out of vertical alinement with the lower end of the frame member 2, thus twisting the gate so as to throw it off-center and cause it to swing open into a position at right angles with the post 3.

A latch 28 on the front end of the gate A engages with a keeper 26 on a post 27 to retain the gate in an open position.

To close the gate, either one of the cranks 21 is rocked in such direction as to pull the cable 17 or 18 in the direction opposite that required to open the gate, so as to restore the cross head 16 and the disk 7, rod 8 and link 12 to their normal position, which action operates in the same manner as described in relation to opening the gate, but in this case, reversing the direction of movement.

It is obvious that the gate may be open or closed by operating either of the cranks 21; the cables 17 and 18 being so connected to the sheave 19 that when a crank 21 is rocked toward the gate the gate will open, and when rocked away from the gate the latter will close. It will be seen that the cranks 21 will be immediately returned to a vertical position after being depressed by a vehicle passing thereover by means of the counterweight 24, so as to be in position to be rocked in an opposite direction to swing the gate in a direction opposite that previously taken. The cables 17 and 18 are sufficiently slack to permit of a certain movement of either of the sheaves 19 and cranks 21 in one direction without affecting the other, as shown in diagram in Fig. 14, from which it will be seen that when the crank 21 is rocked in the direction of the arrow z the cable 17 will actuate the cross head 16 to operate the gate, the other crank and the cable 18 being undisturbed. The slack portion of the cable 17, however, will be taken up sufficiently by the change of position of the cross head 16 that when the innermost crank 21 is actuated in a direction away from the gate, the cross head 16 will be restored to its original position.

Having thus described my invention, what I claim and desire to secure by Letters Patent is—

1. In a gate, the combination of a fixed support, top and bottom brackets thereon, a revoluble disk mounted in the bottom bracket, a vertically disposed rod eccentrically mounted on said disk and extending upward through the top bracket, and a gate having its lower end pivoted on said rod, a link connecting the upper end of the gate to the top bracket, and a crank arm on said rod pivotally connected to said link.

2. In a gate, the combination of a fixed support, top and bottom brackets thereon, a revoluble disk mounted in the bottom bracket, a vertically disposed rod eccentrically mounted on said disk and extending upward through the top bracket, a gate having its lower end pivoted on said rod, a link connecting the upper end of the gate to the top bracket, a crank arm on said rod pivotally connected to said link, and means for oscillating said revoluble disk and rod to actuate said link to cause the gate to open and close.

3. In a gate, the combination of a fixed support, top and bottom brackets thereon, a revoluble disk mounted in the bottom bracket, a vertically disposed rod eccentrically mounted on said disk and extending upward through the top bracket, a gate having its lower end pivoted on said rod, a link connecting the upper end of the gate to the top bracket, a crank arm on said rod pivotally connected to said link, and means for oscillating said revoluble disk and rod to actuate said link to cause the gate to open and close, said means embodying a cross-head on the disk and oppositely extending cables attached to the outer ends of the cross-head and means for operating the cables to oscillate said cross-head.

4. In a gate, the combination of a fixed support, top and bottom brackets thereon, a revoluble disk mounted in the bottom bracket, a vertically disposed rod eccentrically mounted on said disk and extending upward through the top bracket, a gate having its lower end pivoted on said rod, a link connecting the upper end of the gate to the top bracket, a crank arm on said rod pivotally connected to said link, means for oscillating said revoluble disk and rod to actuate said link to cause the gate to open and close, said means embodying a cross-head on the disk and oppositely extending cables attached to the outer ends of the cross-head, and means for operating the cables to oscillate said cross-head, said last named means consisting of a rockable member to which the cables are attached and a bail on the rockable member by which the latter is actuated.

5. In a gate, the combination of a fixed support, top and bottom brackets thereon, a revoluble disk mounted in the bottom bracket, a vertically disposed rod eccentrically mounted on said disk and extending upward through the top bracket, a gate having its lower end pivoted on said rod, a link connecting the upper end of the gate to the top bracket, a crank arm on said rod pivotally connected to said link, means for oscillating said revoluble disk and rod to actuate said link to cause the gate to open and close, said means embodying a cross-head on the disk and oppositely extending cables attached to the outer ends of the cross-head, means for operating the cables to oscillate said cross-head, said last named means consisting of a rockable member to which the cables are attached and a bail on the rockable member by which the latter is actuated, and means on said rockable member for normally retaining the bail in a vertical position.

6. In a gate, the combination of a fixed support, top and bottom brackets thereon, a revoluble disk mounted in the bottom bracket, a vertically disposed rod eccentrically mounted on said disk and extending upward through the top bracket, a gate having its lower end pivoted on said rod, a link connecting the upper end of the gate to the top bracket, a crank arm on said rod pivotally connected to said link, means for oscillating said revoluble disk and rod to actuate said link to cause the gate to open and close, said means embodying a cross-head on the disk and oppositely extending cables attached to the outer ends of the cross-head, means for operating the cables to oscillate said cross-head, said last named means consisting of a rockable member to which the cables are attached and a bail on the rockable member by which the latter is actuated, and means on said rockable member for normally retaining the bail in a vertical position, said means comprising a guided counterweight bearing on shoulders formed on each side of the pivotal point of said rockable member.

In testimony whereof I have hereunto set my hand in the presence of two subscribing witnesses.

PRENTISS R. GRAHAM.

Witnesses:
J. H. GRAHAM,
G. W. LIBBY.